United States Patent
Yakota

[11] 3,868,174
[45] Feb. 25, 1975

[54] TELEPHOTO TYPE OBJECTIVE OF LARGE RELATIVE APERTURE RATIO

[75] Inventor: Hideo Yakota, Tokyo, Japan

[73] Assignee: Canon Kobushiki Kaisha, Tokyo, Japan

[22] Filed: July 24, 1973

[21] Appl. No.: 382,284

[30] Foreign Application Priority Data
Aug. 3, 1972  Japan.................. 47-77308

[52] U.S. Cl.................. 350/216, 350/177, 350/220, 350/232
[51] Int. Cl........ G02b 9/60, G02b 1/00, G02b 9/34
[58] Field of Search............ 350/177, 216, 220, 232

[56] References Cited
UNITED STATES PATENTS

| | | | |
|---|---|---|---|
| 2,576,436 | 11/1951 | Baker | 350/216 X |
| 2,649,022 | 8/1953 | Angenieux | 350/216 |
| 3,502,394 | 3/1970 | Kobayashi | 350/216 |
| 3,774,991 | 11/1973 | Shimizu | 350/220 X |

FOREIGN PATENTS OR APPLICATIONS

| | | | |
|---|---|---|---|
| 1,120,735 | 12/1961 | Germany | 350/216 |

*Primary Examiner*—Paul A. Sacher
*Attorney, Agent, or Firm*—McGlew and Tuttle

[57] ABSTRACT

A telephoto type objective having a large relative aperture ratio comprising a three-component positive front lens group and a two-component negative rear lens group, which is spherically and chromatically corrected and which also is corrected for coma and astigmatism, to thereby provide high grade imaging performance over the entire field of the picture frame, particularly regarding reduced secondary color.

3 Claims, 12 Drawing Figures

Spherical Aberration

Astigmatism

Distortion

Spherical Aberration   Astigmatism   Distortion

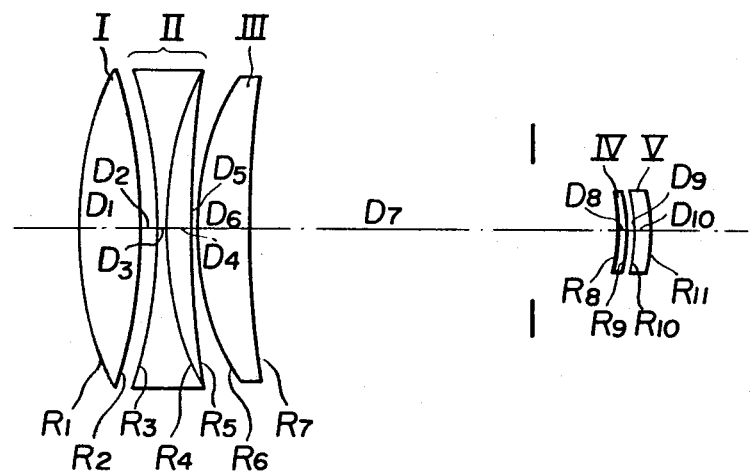

TELEPHOTO TYPE OBJECTIVE OF LARGE RELATIVE APERTURE RATIO

FIELD AND BACKGROUND OF THE INVENTION

This invention relates to a telephoto type objective having a relative aperture ratio of as large as 1 : 2.8 with a field angle of 8.24°.

Tele objectives, which may be conveniently considered as comprising a front lens group, and a rear lens group are classified by the distribution of power between these two lens groups into two great categories, that is, (1) the Petzval type in which both of the front and rear groups have positive powers, and (2) the so-called telephoto type in which the front group has a positive power and the rear group has a negative power.

In providing tele objectives of such configurations so constructed as to have a large relative aperture, the Petzval type has an advantage in facilitating correction for spherical aberrations, coma aberrations and chromatic aberrations. But its disadvantage consists in that the Petzval sum is so large that curvature of the image field is not well corrected, and that the distance from the first surface of the complete system to the focal plane, that is, the total length of the lens barrel of a tele objective which is of a large diameter, must be increased, so that the handling of the objective is difficult when photographing.

In contrast to the Petzval type, the advantage of the telephoto type consists in that it is possible to minimize the overall length of the complete objective so as to keep its weight and bulk within easily manageable proportions, and simultaneously reduce the Petzval sum. But, the solution of aberrational problems with respect to spherical aberration, and chromatic and coma aberrations are made more difficult as compared with the former. Particularly the quantity of dispension of secondary spectrum is objectionably increased.

SUMMARY OF THE INVENTION

The object of this invention is to provide a telephoto type objective of a greatly increased relative aperture ratio of which the physical size is minimized by virtue of the choice of the advantage of the telephoto type, and which overcomes the difficult aberrational problems to provide high grade imaging performance over the whole frame of picture.

In order to realize the object, according to the construction of the invention, the objective is composed of a front lens group consisting of three components and a rear lens group. A first lens component designated I in the front lens group is a double convex singlet, a second component II is a negative singlet of forward concavity, or a negative doublet of negative and positive lens elements cemented together, according to a preferred embodiment, a double concave singlet, or negative cemented doublet, and a third component III is a positive singlet of strong forward convexity. The combination of all the three components contribute positive power to the system.

The rear lens group comprises a fourth component IV of a negative singlet of forward concavity and a fifth component V of a positive singlet or a positive doublet of negative and positive lens elements, the refractive power of the combination of these two components being negative. The negative singlet of component IV may be cemented to the positive singlet of component V.

The telephoto type objective so constructed in accordance with the invention is characterized by the following relationships in combinations:

$$f > L_1 \geqslant 0.86f \qquad (1)$$
$$20 < V_A - V_B \qquad (2)$$
$$1 < R_{I-2}/R_{II-1} < 1.34 \qquad (3)$$
$$-0.3 < R_{III-1}/R_{III-2} < 0.4 \qquad (4)$$
$$0.14f < -R_{IV-1} < 0.17f \qquad (5)$$

wherein
- $f$: The equivalent focal length of the complete objective
- $L_1$: The distance from the front vertex of the first component in the front group to the image plane: the total length
- $V_A$: The mean value of the sum of the Abbe numbers of the positive lens elements in the components I—III
- $V_B$: The mean value of the sum of the Abbe numbers of the negative lens elments in the components I–III
- $R_{I-2}$: The radius of the second surface of component I.
- $R_{II-1}$: The radius of the first surface of component II.
- $R_{III-1}$: The radius of the first surface of component III.
- $R_{III-2}$: The radius of the second surface of component III.
- $R_{IV-1}$: The radius of the first surface of the rear lens group, or the first surface of component IV.

In order to facilitate correction of various aberrations, the total length of the complete objective must lie within the limits of condition 1. When the total length is equal to the focal length, it is difficult to reduce the Petzval sum to zero, so that increases in the refractive powers of the both front and rear groups cause the quantity of dispersion of the secondary spectrum to increase. As far as a telephoto type objective of large relative aperture ratio is concerned, the provision for a filter is made between the rear group and the image plane, because the front lens group is of a large diameter which increases the diameter of a filter to be attached to the front lens assembly. In order to secure a space in which a filter is to be inserted, the upper limit may be preferably $0.92f$. When the upper limit is violated, it is difficult to secure a sufficient back focus while still maintaining a reduced Petzval sum. When the lower limit is violated, a large negative Petzval sum results to increase the quantity of dispersion of secondary spectrum. Therefore, for the achievement of minimizing the dispersion of secondary spectrum, the selection of glasses of which the negative and positive lens elements constituting the components, I, II and III are made is an important factor in connection with the condition I.

Suppose that a thin lens system in mutual contact is chromatically corrected for the spectral C and G lines of sodium, we see that the state of chromatic aberrations for the spectral C and F lines of sodium as secondary color may be estimated with respect to dispersion W and partial dispersion ratio S $$W = (N_C - 1)/(N_G - N_C)$$
$$S = (N_F - N_C)/(N_G - N_C)$$

Hence, the quantity of dispersion of secondary spectrum $Z(C,F)$ caused in the front group of positive power is expressed by $$Z(C,F) = -f_0(S_1-S_2)/(W_1-W_2)$$

wherein $W_1$ and $W_2$ are respectively the dispersions of positive and negative lens elements: $S_1$ and $S_2$ are respectively the partial dispersion ratios, and $f_o$ is the focal length of the front group.

Therefore, it is preferred that achromatism of the front lens group is effected by virtue of a combination of glasses selected so as to reduce $(S_1-S_2)/(W_1-W_2)$ to as small a value as possible. In practice, it is desirable to select $(S_a-S_b)/(W_a-W_b) < 0.9 \times 10^{-3}$, wherein $W_a$ is an average dispersion of the positive lens elements, $S_a$ is likewise an average partial dispersion ratio, while $W_b$ is an average dispersion of the negative lens elements, and $S_b$ is likewise an average partial dispersion ratio.

Examples of preferred combinations of glasses selected so as to restrict the quantity of dispersion of secondary spectrum under the above specified dimension, there may be mentioned fluorosilicate crown glass, biphosphate crown glass, or fluorite, of which the positive lens elements are made, in combination with flint glass and heavy lanthanum flint glass, of which the negative lens elements are made. The combination of fluorosilicate crown glass and heavy lanthanum crown glass, of which the negative lens elements are made. The combination of fluorosilicate crown glass and heavy lanthanum crown glass, or the combination of biphosphate crown glass and heavy lanthanum crown glass may be employed. In these cases, however, a difficult problem of correcting aberrations is created, which requires for its solution either to impart an additional cemented surface in the front lens group as shown in Example 3 to be described, or to add an additional surface of the same action.

Condition 2 defines the limit which permits good correction for chromatic aberrations to be effected inasmuch as the combination of glasses is selected so as to minimize the quantity of dispersion of secondary spectrum. When the limit can violated, accommodation for the correction is hardly be made with an additional achromatic cemented surface. In order to satisfy condition 2, the positive lens elements in the front lens group should be necessarily made of a glass having a low refractive index of less than 1.63 so that deterioration of spherical aberrations and coma aberration is unavoidable. For compensation of the deterioration, the radius of curvature of the second surface of component I is increased, being more than 1 to less than 1.34 times that of the first surface of component II to thereby cancel the above defect. However, the radius of the first surface of component II considerably affects spherical aberrations and astigmatism. If a good result is to be effected, therefore, the radius of curvature of this surface is controlled under conditions that abberational correction is sufficient for coma but slightly insufficient for spherical aberrations. Residual spherical aberration caused by the under-correction is compensated by the design of the rear lens group which produces little aberrations of higher order. Condition 3 implies such a situation, so that when the upper limit is violated, spherical aberrations of higher order results in over-correction, while when the lower limit is violated, correction for coma is made difficult.

Condition 4 is set forth both for the purpose of correcting for spherical aberration by weakening the curvature of the second surface of component III which most seriously affects spherical aberrations as far as this lens system is concerned, and for the purpose of correcting to compensate the over-correction of astigmatism effected by the first surface of component II. When the upper limit is violated, astigmatism results in over-correction, when the lower limit is violated, the correction for compensating residual spherical aberration is made difficult.

Condition 5 assists the correction for compensating residual spherical aberration which is left under-corrected in the front group. When the lower limit is violated, correction for spherical aberrations cannot be made without difficulty within the limitations defined in conditions 3 and 4. When the upper limit is violated, coma aberrations results in over-correction to thereby give an added disadvantage.

BRIEF DESCRIPTION OF THE DRAWING

The examples of the present invention will be described referring to the attached drawings in which:

FIg. 5 is a diagrammatic view of Example 3.

FIGS. 6a, 6b and 6c are aberration curves in Example 3.

DETAILED DESCRIPTION OF THE PREFERRED EMBODIMENTS

Constructional data for three examples of one preferred embodiment of the telephoto type objective of the present invention are given hereinbelow.

R: Radius of curvature of the successive refracting surfaces.

D: Axial thicknesses of the successive lens elements, or air spaces.

N: Refractive indices (for $d$ line of spectrum) of glasses of the successive lens elements.

V: Abbe numbers of glasses of the successive lens elements.

Figure 1:
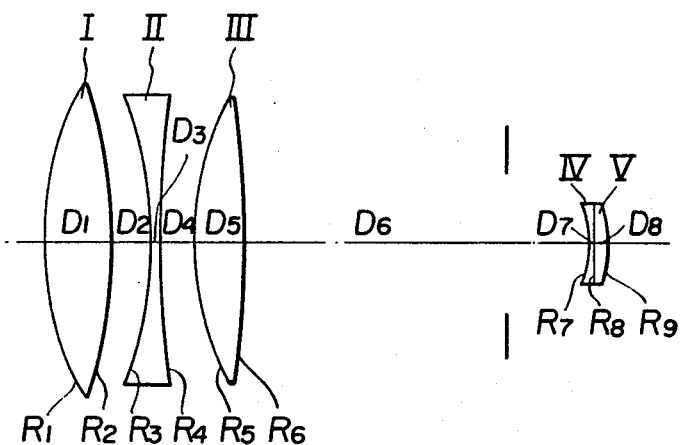
FIG. 1 is a diagrammatic view of Example 1 of the telephoto type objective according to the present invention.
Figure 2A:
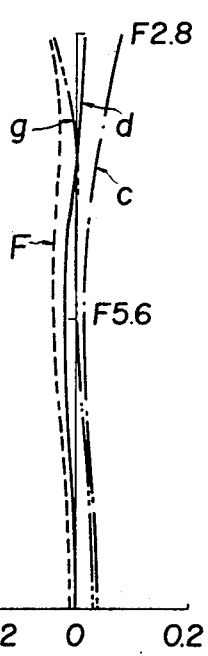
FIGS. 2a, 2b and 2c are aberration curves in Example 1.
Figure 2B:
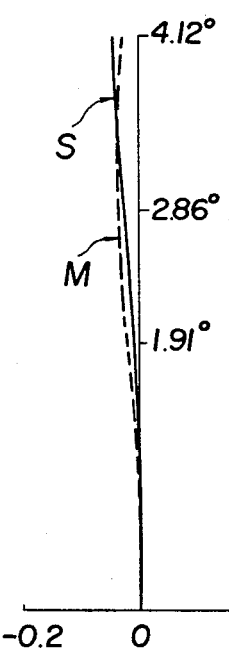
Figure 2C:
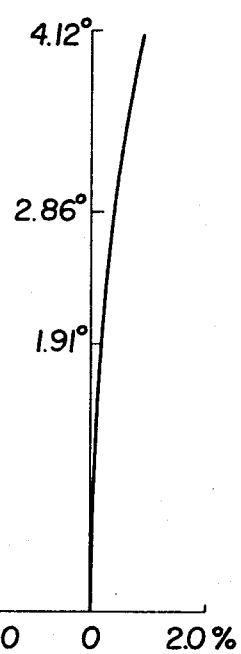

Example 1 (FIG. 1)

$f = 100 \quad F = 2.8 \quad 2\omega = 8.24°$
Back focus = 23.73

| | | | |
|---|---|---|---|
| $R_1 = 40.586$ | | | |
| | $D_1 = 7.4978$ | $N_1 = 1.43387$ | $V_1 = 95.1$ |
| $R_2 = -64.262$ | | | |
| | $D_2 = 5.0632$ | | |
| $R_3 = -48.2052$ | | | |
| | $D_3 = 1.7929$ | $N_2 = 1.7859$ | $V_2 = 44.2$ |
| $R_4 = 269.4636$ | | | |
| | $D_4 = 3.468$ | | |
| $R_5 = 38.0994$ | | | |
| | $D_5 = 5.5696$ | $N_3 = 1.48749$ | $V_3 = 70.1$ |
| $R_6 = -174.7872$ | | | |
| | $D_6 = 41.1339$ | | |
| $R_7 = -15.9528$ | | | |
| | $D_7 = 0.6936$ | $N_4 = 1.51633$ | $V_4 = 64.1$ |
| $R_8 = -63.1176$ | | | |
| | $D_8 = 1.2484$ | $N_5 = 1.72151$ | $V_5 = 29.2$ |
| $R_9 = -34.8221$ | | | |

$L_1 = 90.20$
$V_A = 82.6$
$V_B = 44.2$

Aberration coefficients of Example 1 are shown in the following table.

| No. | I | II | III | P | V |
|-----|---|----|-----|---|---|
| 1 | 3.1554 | −2.6670 | 2.2541 | 0.7455 | −2.5352 |
| 2 | 11.2919 | −17.2687 | 26.4091 | 0.4708 | −41.1073 |
| 3 | −16.7703 | 24.6137 | −36.1255 | −0.9128 | 54.3610 |
| 4 | −0.0022 | −0.0073 | −0.0250 | −0.1633 | −0.6424 |
| 5 | 1.8643 | −0.9946 | 0.5306 | 0.8601 | −0.7419 |
| 6 | 2.3415 | −3.9560 | 6.6839 | 0.1875 | −11.6094 |
| 7 | −2.3006 | 0.7958 | −0.2753 | −2.1343 | 0.8335 |
| 8 | −0.0274 | 0.0661 | −0.1596 | −0.1245 | 0.6858 |
| 9 | 0.5560 | −0.6858 | 0.8458 | 1.2034 | −2.5276 |
| $\epsilon$ | 0.1087 | −0.1038 | 0.1381 | 0.1324 | −3.2837 |

| No. | L | T |
|-----|---|---|
| 1 | 0.00966 | −0.00816 |
| 2 | 0.01175 | −0.01797 |
| 3 | −0.03754 | 0.05510 |
| 4 | −0.00277 | −0.00946 |
| 5 | 0.01060 | −0.00566 |
| 6 | 0.00849 | −0.01435 |
| 7 | −0.00461 | 0.00159 |
| 8 | −0.00344 | 0.00831 |
| 9 | 0.00749 | −0.00924 |
| $\epsilon$ | −0.00038 | 0.00018 |

L: On-axis chromatic aberration coefficients
T: Lateral chromatic aberration coefficients

Figure 3:
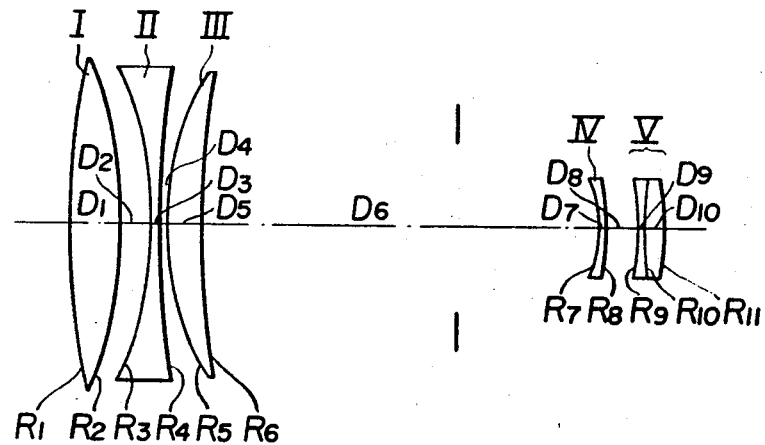
FIG. 3 is a diagrammatic view of Example 2.
Figures 4A, 4B, 4C:
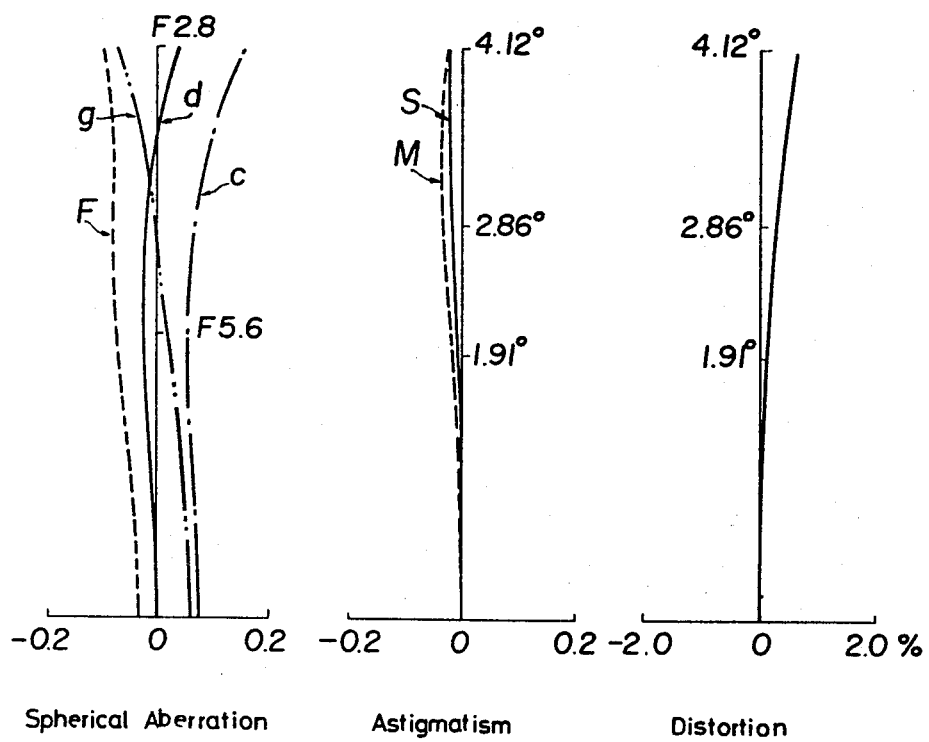
FIGS. 4a, 4b and 4c are aberration curves in Example 2.

Example 2 (FIG. 3)

$f = 100 \quad F = 2.8 \quad 2\omega = 8.24°$
Back focus = 23.58

$R_1 = 91.8891$
$\quad D_1 = 5.6661 \quad N_1 = 1.61800 \quad V_1 = 63.4$
$R_2 = -55.7244$
$\quad D_2 = 3.3529$
$R_3 = -44.6708$
$\quad D_3 = 1.5 \quad N_2 = 1.62004 \quad V_2 = 36.3$
$R_4 = 135.877$
$\quad D_4 = 0.3266$
$R_5 = 31.5311$
$\quad D_5 = 4.3852 \quad N_3 = 1.61800 \quad V_3 = 63.4$
$R_6 = 92.2907$
$\quad D_6 = 45.5587$
$R_7 = -16.3853$
$\quad D_7 = 0.9065 \quad N_4 = 1.51633 \quad V_4 = 64.1$
$R_8 = -28.2835$
$\quad D_8 = 3.3333$
$R_9 = -52.1851$
$\quad D_9 = 1.1232 \quad N_5 = 1.49831 \quad V_5 = 65.0$
$R_{10} = 127.4969$
$\quad D_{10} = 1.9164 \quad N_6 = 1.74400 \quad V_6 = 44.8$
$R_{11} = -60.3926$ $f = 100 \quad F = 2.8 \quad 2\omega = 8.24°$
Back focus = 23.58
$L_1 = 91.65$
$V_A = 63.4$
$V_B = 36.3$ Aberration coefficients of Example 2 are shown in the following table.

| No. | I | II | III | P | V |
|-----|---|----|-----|---|---|
| 1 | 0.3041 | 0.0292 | 0.0028 | 0.4156 | 0.0402 |
| 2 | 17.9959 | −19.4212 | 20.9594 | 0.6853 | −23.3590 |
| 3 | −20.9224 | 21.6732 | −22.4510 | −0.8566 | 24.1440 |
| 4 | −0.0398 | −0.0424 | −0.0453 | −0.2816 | −0.3485 |
| 5 | 4.7010 | −1.6345 | 0.5683 | 1.2112 | −0.6187 |
| 6 | 0.0573 | −0.2345 | 0.9592 | −0.4138 | −2.2307 |
| 7 | −2.7811 | 0.0288 | −0.0003 | −2.0778 | 0.0215 |
| 8 | 0.7223 | −0.4682 | 0.3035 | 1.2037 | −0.9769 |
| 9 | −0.2848 | 0.3376 | −0.4001 | −0.6372 | 1.2295 |
| 10 | −0.0021 | 0.0193 | −0.1746 | 0.0737 | 0.9130 |
| 11 | 0.3497 | −0.3486 | 0.3475 | 0.7063 | −1.0505 |
| $\epsilon$ | 0.1001 | −0.0614 | 0.0694 | 0.0287 | −2.2361 |

| No. | L | T |
|-----|---|---|
| 1 | 0.00813 | 0.00078 |
| 2 | 0.02559 | −0.02762 |
| 3 | −0.04757 | 0.04928 |
| 4 | −0.00754 | −0.00804 |
| 5 | 0.01930 | −0.00671 |
| 6 | 0.00220 | −0.00902 |
| 7 | −0.00548 | 0.00006 |
| 8 | 0.00342 | −0.00222 |
| 9 | −0.00214 | 0.00254 |
| 10 | −0.00053 | 0.00481 |
| 11 | 0.00396 | −0.00394 |
| $\epsilon$ | −0.00066 | −0.00008 |

Example 3 (FIG. 5)

$f = 100 \quad F = 2.8 \quad 2\omega = 8.24°$
Back focus = 22.36

$R_1 = 47.9543$
$\quad D_1 = 6.9659 \quad N_1 = 1.61800 \quad V_1 = 63.4$
$R_2 = -64.9208$
$\quad D_2 = 1.5565$
$R_3 = -56.9098$ $f = 100 \quad F = 2.8 \quad 2\omega = 8.24°$
Back focus = 22.36
$\quad D_3 = 1.5798 \quad N_2 = 1.78590 \quad V_2 = 44.2$
$R_4 = 40.5761$
$\quad D_4 = 3. \quad N_3 = 1.48749 \quad V_3 = 70.1$
$R_5 = 149.1607$
$\quad D_5 = 0.3333$
$R_6 = 34.0225$
$\quad D_6 = 6.5393 \quad N_4 = 1.61800 \quad V_4 = 63.4$

Example 3 (FIG. 5)-Continued $R_7 = 276.4253$
$D_7 = 41.9924$
$R_8 = -15.4491$
$\quad D_8 = 0.5 \quad N_5 = 1.58313 \quad V_5 = 56.4$
$R_9 = -53.4819$
$D_9 = 0.7865$
$R_{10} = -54.1229$
$\quad D_{10} = 2.0664 \quad N_6 = 1.72151 \quad V_6 = 29.2$
$R_{11} = -30.6202$
$L_1 = 87.68$
$V_A = 65.6$
$V_B = 44.2$ Aberration coefficients of Example 3 are shown in the following table.

| No. | I | II | III | P | V |
|---|---|---|---|---|---|
| 1 | 2.1400 | −1.4755 | 1.0173 | 0.7964 | −1.2505 |
| 2 | 21.2428 | −30.0404 | 42.4816 | 0.5883 | −60.9072 |
| 3 | −24.7582 | 34.5471 | −48.2062 | −0.7732 | 68.3448 |
| 4 | −1.4265 | 1.0414 | −0.7602 | −0.2768 | 0.7571 |
| 5 | −0.0518 | −0.0367 | −0.0260 | −0.2197 | −0.1739 |
| 6 | 4.0577 | −2.6239 | 1.6967 | 1.1225 | −1.8231 |
| 7 | 0.8337 | −1.7410 | 3.6357 | −0.1382 | −7.3036 |
| 8 | −2.4961 | 0.7782 | −0.2426 | −2.3840 | 0.8189 |
| 9 | 0.1996 | −0.4611 | 1.0654 | 0.6886 | −4.0527 |
| 10 | −0.2053 | 0.4736 | −1.0927 | −0.7743 | 4.3075 |
| 11 | 0.5627 | −0.5800 | 0.5978 | 1.3686 | −2.0267 |
| ε | 0.0986 | −0.1183 | 0.1667 | −0.0016 | −3.3095 |

| No. | L | T |
|---|---|---|
| 1 | 0.01558 | −0.01074 |
| 2 | 0.02571 | −0.03635 |
| 3 | −0.04331 | 0.06043 |
| 4 | −0.01879 | 0.01372 |
| 5 | −0.00321 | −0.00227 |
| 6 | 0.01784 | −0.01154 |
| 7 | 0.00694 | −0.01449 |
| 8 | −0.00537 | 0.00168 |
| 9 | 0.00220 | −0.00509 |
| 10 | −0.00517 | 0.01194 |
| 11 | 0.00726 | −0.00748 |
| ε | −0.00033 | −0.00021 |

FIGS. 2a, 2b and 2c, FIGS. 4a, 4b and 4c, and FIGS. 6a, 6b and 6c illustrate the states of correction of image aberrations in Example 1, Example 2 and Example 3 respectively. It is apparent from the aberration curves that each of the aberrations is well corrected.

What is claimed is:

1. A telephoto type objective lens, having a large relative aperture ratio, comprising a front lens group of positive refractive power and a rear lens group of negative refractive power; said front lens group including, in sequence from front to rear and in spaced relation to each other, a biconvex single lens, a biconcave single lens and a positive single lens; said biconvex single lens being a fluorspar; said rear lens group including in sequence and in alternation a negative lens and a positive lens.

2. A telephoto type objective lens having a large relative aperture ratio, as claimed in claim 1, in which said positive single lens of said front lens group is a biconvex lens; said rear lens group including a negative singlet and a positive singlet cemented together with a forwardly facing concavity.

3. A telephoto type objective lens having a large relative aperture ratio, as claimed in claim 2, in which said objective lens satisfies the following constructional data:

$f = 100 \quad F = 2.8 \quad 2\omega = 8.24° \quad$ Back focus $= 23.73$
$R_1 = 40.586 \quad D_1 = 7.4978 \quad N_1 = 1.43387 \quad V_1 = 95.1$
$R_2 = -64.262 \quad D_2 = 5.0632$
$R_3 = -48.2052 \quad D_3 = 1.7929 \quad N_2 = 1.7859 \quad V_2 = 44.2$
$R_4 = 269.4636 \quad D_4 = 3.468$
$R_5 = 38.0994 \quad D_5 = 5.5696 \quad N_3 = 1.48749 \quad V_3 = 70.1$
$R_6 = -174.7872 \quad D_6 = 41.1339$
$R_7 = -15.9528 \quad D_7 = 0.6936 \quad N_4 = 1.51633 \quad V_4 = 64.1$
$R_8 = -63.1176 \quad D_8 = 1.2484 \quad N_5 = 1.72151 \quad V_5 = 29.2$
$R_9 = -34.8221$
$L_1 = 90.20$
$V_A = 82.6$
$V_B = 44.2$ and further satisfies the following aberration coefficient:

| No. | I | II | III | P | V |
|---|---|---|---|---|---|
| 1 | 3.1554 | −2.6670 | 2.2541 | 0.7455 | −2.5352 |
| 2 | 11.2919 | −17.2687 | 26.4091 | 0.4708 | −41.1073 |
| 3 | −16.7703 | 24.6137 | −36.1255 | −0.9128 | 54.3610 |
| 4 | −0.0022 | −0.0073 | −0.0250 | −0.1633 | −0.6424 |
| 5 | 1.8643 | −0.9946 | 0.5306 | 0.8601 | −0.7419 |
| 6 | 2.3415 | −3.9560 | 6.6839 | 0.1875 | −11.6094 |
| 7 | −2.3006 | 0.7958 | −0.2753 | −2.1343 | 0.8335 |
| 8 | −0.0274 | 0.0661 | −0.1596 | −0.1245 | 0.6858 |
| 9 | 0.5560 | −0.6858 | 0.8458 | 1.2034 | −2.5276 |
| ε | 0.1087 | 0.1038 | 0.1381 | 0.1324 | −3.2837 |

* * * * *